Jan. 10, 1967   J. J. EATON   3,297,505
METHOD OF MAKING ELECTRICAL CAPACITORS
Filed Oct. 24, 1961
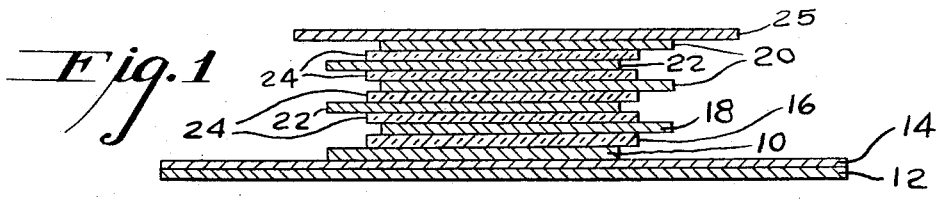
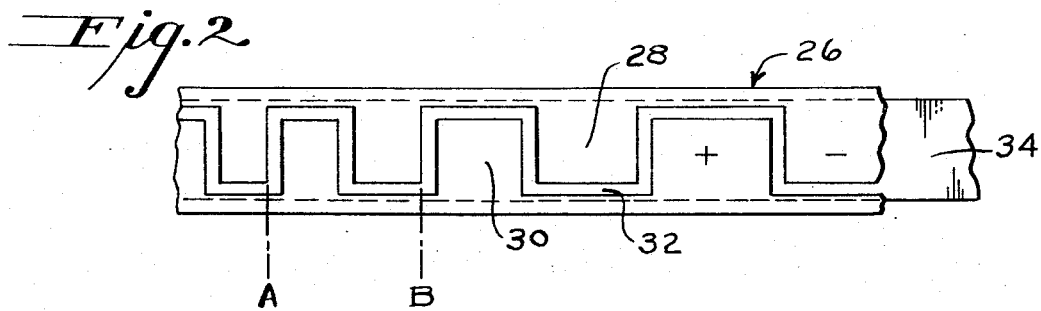
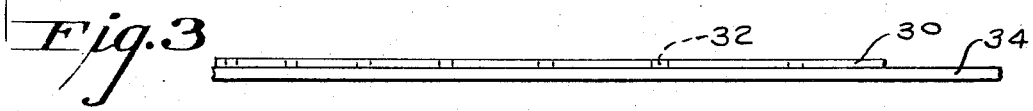
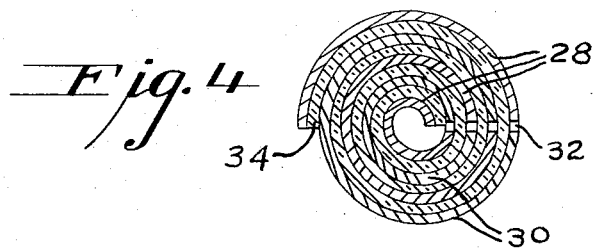
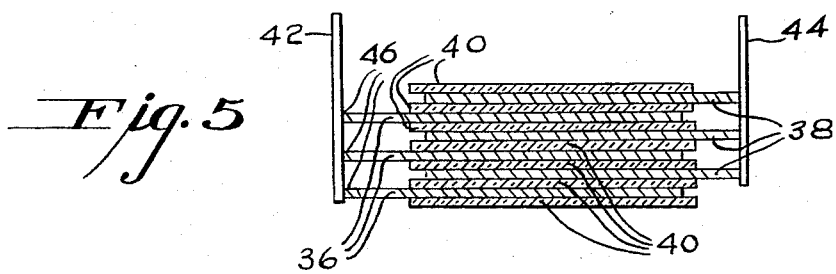
INVENTOR
JAMES J. EATON
BY
ATTORNEY

United States Patent Office 3,297,505
Patented Jan. 10, 1967

3,297,505
METHOD OF MAKING ELECTRICAL
CAPACITORS
James J. Eaton, Painted Post, N.Y., assignor to Corning Glass Works, Corning, N.Y., a corporation of New York
Filed Oct. 24, 1961, Ser. No. 159,809
15 Claims. (Cl. 156—89)

This invention relates to electrical capacitors and more particularly to a method of making capacitors where the whole capacitor or part thereof is formed as a decalomania.

Capacitors of the laminated or stratified type are well known in the art. Such capacitors comprise a plurality of capacitor plates in an alternating and overlapping relation with a plurality of insulating plates.

An object of this invention is to provide a new method for forming capacitors for use in printed circuits.

Another object is to provide an improved method of forming capacitors wherein the capacitor plates and insulating material are very thin.

Still another object is to provide an improved method for forming reeled capacitors from a single strip.

Additional objects, features and advantages of the present invention will become apparent, to those skilled in the art, from the following detailed description and the attached drawing, on which, by way of example, only the preferred embodiments of this invention are illustrated. I have found that such objects can be achieved by forming a water slide-off or hot transfer decalcomania, where the transferable portion thereof comprises either an individual layer of an electroconductive coating or at least two layers of an electroconductive coating in an alternating and overlapping relation with layers of a dielectric material, removing said transferable portion and, where required, further forming a capacitor by stacking, reeling and the like, thereafter firing the capacitor to bond or fuse the layers of the electro-conductive coating to the adjacent layers of dielectric material and to a substrate, if any, and to volatilize all organic constituents of said coatings and insulating material.

FIG. 1 is a cross section of a typical water slide-off decalcomania and a capacitor formed thereon.

FIG. 2 is a fragmentary plan view of a patterned strip suitable for reeling.

FIG. 3 is an elevation of the patterned strip illustrated in FIG. 2.

FIG. 4 is a cross section illustrating a reeled capacitor.

FIG. 5 is a cross section illustrating a capacitor formed by stacking.

Any known electro-conductive coating material which may be formed as a viscous mixture is suitable for the present purpose. By electro-conductive coatings is meant thin coatings or films generally composed of varying combinations of noble or non-noble metals, metal oxides, fillers, fluxes and moistening agents. The various compositions yield coatings of various resistive values; however, coatings having a high metallic content generally have the lowest resistance and are most useful for capacitor applications. Innumerable combinations of materials may be used in forming an electro-conductive coating within the scope of this invention and no particular combination of materials forms a part of this invention.

A preferred embodiment of this invention is illustrated by FIG. 1 of the drawing which shows a water slide-off decalcomania. An electro-conductive coating 10, is applied by silk screening, or other method capable of depositing a uniform thickness of material, to a decalcomania paper comprising backing paper 12, and a film of water soluble gum 14. The composition of the water soluble gum 14 is not critical and may be any water soluble gum, for example, such as is generally supplied as a coating on commercially available water slide-off decalcomania paper. A decalcomania paper is used because it is inexpensive and readily available although any flexible backing from which a subsequently applied electro-conductive coating is readily separable, is equally suitable for the present purposes. A film of a non-porous high dielectric glazing material 16, is then applied to a portion of the electro-conductive coating 10, and is suitably positioned to expose an edge of said coating for subsequent lead attachments. Any known dielectric material having thermoplastic properties, which can be formed as a viscous mixture and has the desired electrical insulating properties, is suitable for use as the dielectric glazing material. An example of a particularly useful material is finely divided glass, a viscous mixture of which is prepared by the addition of a suitable vehicle or moistening agent.

A second electro-conductive coating 18, is then applied to said glazing material in the manner described above, and is positioned with its exposed edge on a side other than the side where the exposed edge of the first coating was positioned. Coatings 10 and 18 are individual electrodes and form one set of capacitor plates having a film of a non-porous high dielectric glazing material 16 disposed therebetween. Thereafter, as many additional sets of plates may be applied in the above manner as are required to form a capacitor of desired characteristics. These are illustrated by coatings 20 and 22 which form additional sets of capacitor plates, having a film of glazing material 24 between each adjacent pair of plates. A film 25, of lacquer or similar material, is then applied to form a carrier. One familiar with the art can readily select a suitable carrier material.

A capacitor, so formed, may then be removed from the decalcomania backing paper in the usual manner, and fired in a furnace or kiln to volatilize and oxidize the organic constituents of the electro-conductive coatings and glazing material and to fuse each of the layers of these materials to its adjacent layers. After leads are attached by soldering, cementing or the like, the capacitor may thereafter be encapsulated in a manner well known to one familiar with the art. In addition, however, it may be incorporated within a printed circuit. In such an embodiment the capacitor may be formed separately and thereafter suitably positioned within the printed circuit before firing, or may be formed as an integral part of the circuit.

It should be noted that all electro-conductive coatings and glazing materials are illustrated in greatly exaggerated thickness. The thickness of the individual layers generally varies from slightly more than the molecular size of the material to about several thousandths of an inch.

FIGURES 2 and 3 illustrate a patterned strip generally indicated by 26, formed of two capacitor plates 28 and 30, separated by space 32, and applied as coatings to a high dielectric substrate 34. Said strip may be made by forming a decalcomania in accordance with the method heretofore described. Where the substrate 34, is formed on the backing paper and the patterned capacitor plates are formed thereon, thereafter removing said backing paper. It may also be made by forming only the capacitor plates on the backing paper, thereafter removing the plates and disposing them on a high dielectric substrate such as microsheet glass. (Microsheet glass is defined as extremely thin and flexible glass sheet which is less than about 0.25 inch thick.) The capacitor plates form a key pattern of gradually increasing pitch. The pitch A–B of the key pattern is equal to the circumference of two turns of the roll into which the strip is intended to be wound, the increasing pitch being arranged to compensate for the increase in circumference as the diameter of the roll increases. As shown, capacitor plate 28 extends over one edge of substrate 34, while capacitor plate 30 extends over the other edge.

FIGURE 4 illustrates a capacitor formed by reeling a single patterned strip such as shown in FIGS. 2 and 3, having the capacitor plates applied to only one side thereof. When reeled, leads may be attached to the respective plates from opposite ends of the capacitor, by soldering, cementing or the like, and the capacitor subsequently encapsulated.

FIGURE 5 illustrates a capacitor formed by stacking capacitor plates 36 and 38 in an alternating and overlapping relation with layers of dielectric material 40. Such a capacitor may be stacked using individual capacitor plates and dielectric material layers, formed as heretofore described, or may be stacked using combinations of such layers such as a capacitor plate and layer of dielectric material or two capacitor plates and two layers of dielectric material and the like, said combinations being formed as one transferable portion of said decalcomania. After the desired number of plates are stacked, the unit can then be suitably compressed and fired, forming a small compact capacitor. Capacitor leads 42 and 44 are then affixed to said capacitor with conducting cement 46.

Firing conditions vary for the varoius compositions of electro-conductive coatings as well as the dielectric material compositions. As heretofore noted, these compositions contain various organic constituents to permit them to be silk screened or otherwise applied to a decalcomania paper. Firing schedules must be selected which will volatilize these organic materials and permit the layers of insulating and conducting materials to bond to one another. One familiar with the art of firing electro-conductive and insulating materials can readily determine proper firing schedules for the various material combinations.

A typical example of one method of carrying out the present invention is illustrated by the following description. An electro-conductive coating comprising by weight about 37.5% silver flakes, 10.5% thermally devitrifiable glass and 52.0% of ethyl cellulose vehicle, may be prepared and the desired number of suitably shaped capacitor plates silk screened on a commercially available water slide-off decalcomania paper having a suitable film of water soluble gum applied thereto. A film of nitro-cellulose lacquer is applied to the capacitor plates to form a carrier. The capacitor plates can thereafter be removed from the decalcomania paper, after suitable water soaking, and be stacked in an alternating and overlapping relation with layers of microsheet glass and so arranged that alternate capacitor plates overhang the microsheet glass on one side of the capacitor, while the remaining capacitor plates overhang on the opposite side. A unit so formed may then be suitably compressed and fired to volatilize the organic constituents and to fuse the capacitor plates to the microsheet glass. Lead wires may then be attached with a conducting cement to each set of capacitor plates at the side of the capacitor where the respective set of plates overhang the microsheet glass. Thereafter the capacitor may be encapsulated by any of the various encapsulating methods well known in the art.

It should be noted that although the various examples and embodiments illustrated herein utilize water slide-off decalcomanias, hot transfer type decalcomanias may be used with equal effectiveness. A hot transfer decalcomania is different from a water slide-off type in that a low melting temperature wax is used in place of the water soluble gum on the surface of the decalcomania paper and the carrier is disposed between said wax and the electro-conductive coating. Thereafter, the transferable portion is removed through the application of heat to the decalcomania.

Although the present invention has been described with respect to the specific details of certain embodiments thereof, it is not intended that such details be limitations upon the scope of the invention except insofar as set forth in the following claims.

What is claimed is:
1. The method of making electrical capacitors comprising the steps of applying to a temporary backing a first layer of electro-conductive material, a substantially homogenous layer of dielectric material and a second layer of electro-conductive material in a stacked relation and in the order named, removing said backing, heating the thus formed article to a temperature sufficient to fuse said electro-conductive layers to said dielectric material layer, thereafter cooling said article.

2. The method of claim 1 wherein the dielectric material is glass.

3. The method of making electrical capacitors comprising the steps of applying to at least one removable backing an electro-conductive coating said coating forming a plurality of individual capacitor plates, removing said backing, stacking said plurality of capacitor plates in an alternating and overlapping relation with a plurality of suitably sized substantially homogeneous layers of dielectric material, heating the thus formed article to a temperature sufficient to fuse said capacitor plates to the adjacent dielectric material layers, thereafter cooling said article.

4. The method of claim 3 wherein the dielectric material is glass.

5. The method of making electrical capacitors comprising the steps of applying to a least one removable backing at least one layer of an electro-conductive coating in an alternating and overlapping relation with substantially homogeneous layers of dielectric material, forming a plurality of individual capacitor plate-dielectric material units, removing said backing, stacking said plurality of units, heating the thus formed article to a temperature sufficient to fuse the capacitor plates to the adjacent dielectric material layers, thereafter cooling said article.

6. The method of claim 5 wherein the dielectric material is glass.

7. The method of making electrical capacitors comprising the steps of applying to a removable backing a layer of dielectric material and in an overlapping relation thereto a layer of an electro-conductive coating, said electro-conductive coating being separated into two capacitor plates by a continuous non-coated area, said capacitor plates forming a substantially repeating pattern of opposing and alternating coated areas extending inwardly from about each respective edge of said dielectric material to substantially the other edge, removing said backing, reeling the thus formed strip convolutely, heating the reeled strip to a temperature sufficient to fuse said electro-conductive coating to said dielectric material at all contacting interfaces, thereafter cooling said reeled strip.

8. The method of making electrical capacitors comprising the steps of applying to a removable backing a layer of an electro-conductive coating, said electro-conductive coating being separated into two capacitor plates by a continuous non-coated area, said capacitor plates forming a substantially repeating pattern of opposing and alternating coated areas, removing said backing, applying the thus formed capacitor plates to a dielectric substrate with said coated areas extending inwardly from about each respective edge of said dielectric substrate to substantially the other edge, reeling the thus formed strip convolutely, heating the reeled strip to a temperature sufficient to fuse said electro-conductive coating to said dielectric substrate at all contacting interfaces, thereafter cooling said reeled strip.

9. The method of claim 8 wherein the dielectric substrate is a thin flexible glass sheet having a thickness of less than about 0.025 inch.

10. In the method of making electrical capacitors the improvement comprising applying to a removable backing a plurality of electro-conductive material layers in an alternating and overlapping relation with a plurality of dielectric material layers, thereafter removing said backing and fusing the plurality of said electro-conductive material layers to said dielectric material layers at the contacting interfaces.

11. In the method of making reeled electrical capacitors the improvement comprising applying to a removable backing a layer of dielectric material and in an overlapping relation thereto, a layer of an electro-conductive coating, said coating forming two separated capacitor plates, thereafter removing said backing and reeling the thus formed strip.

12. The mthod of making electrical capacitors comprising the steps of applying to a temporary backing a first layer of an electroconductive material comprising metal particles, a filler, and a moistening agent in the form of a printable viscous mixture, a layer of dielectric material, and a second layer of said electroconductive material in a stacked relation and in the order named, removing said backing, heating the thus formed article to a temperature sufficient to fuse said electroconductive layers to said dielectric material layer, and thereafter cooling said article.

13. The method of making electrical capacitors comprising the steps of applying to at least one removable backing an electroconductive coating comprising metal particles, a filler, and a moistening agent in the form of a printable viscous mixture, removing said backing, stacking said plurality of capacitor plates in an alternating and overlapping relation with a plurality of suitably sized layers of dielectric material, heating the thus formed article to a temperature sufficient to fuse said capacitor plates to the adjacent dielectric material layers, and thereafter cooling said article.

14. The method of making electrical capacitors comprising the steps of applying to at least one removable backing at least one layer of an electroconductive coating comprising metal particles, a filler, and a moistening agent in the form of a printable viscous mixture in an alternating and overlapping relation with layers of dielectric material, forming a plurality of individual capacitor plate-dielectric material units, removing said backing, stacking the plurality of units, heating the thus formed article to a temperature sufficient to fuse the capacitor plates to adjacent dielectric material layers, and thereafter cooling said article.

15. The method of making electrical capacitors comprising the steps of applying to a water slide-off decalcomania paper having a film of water soluble gum thereon a first layer of an electroconductive material comprising metallic flakes, thermally devitrifiable glass and a moistening agent in the form of a printable viscous mixture, applying a layer of dielectric material, printing a second layer of said electroconductive material in a stacked relation and in the order named, drying said layers, removing said decalcomania paper, heating the thus formed article to a temperature sufficient to fuse said electroconductive layers to said dielectric material layer, and thereafter cooling said article.

References Cited by the Examiner
UNITED STATES PATENTS

| | | | |
|---|---|---|---|
| 2,778,762 | 1/1957 | Eisler | 29—25.42 X |
| 2,952,064 | 9/1960 | Randels | 29—25.42 |
| 2,974,396 | 3/1961 | Allison | 29—25.42 |
| 3,019,150 | 1/1962 | Davis et al. | 156—184 |
| 3,020,456 | 2/1962 | Layton et al. | 161—196 |
| 3,028,656 | 4/1962 | Herbert | 156—89 |
| 3,089,801 | 5/1963 | Tierney et al. | 161—196 |
| 3,240,642 | 3/1966 | Gaudio | 156—89 |

OTHER REFERENCES

The Condensed Chemical Dictionary, Sixth edition, 1961, page 1133, Reinhold Publishing Corp., New York city N.Y.

EARL M. BERGERT, *Primary Examiner.*

L. PEAR, *Examiner.*

H. F. EPSTEIN, *Assistant Examiner.*